Aug. 15, 1939.  K. G. A. BÄCKDAHL  2,169,213
TICKET PRINTING OR MARKING AND ISSUING APPARATUS
Filed Aug. 4, 1936   8 Sheets—Sheet 1
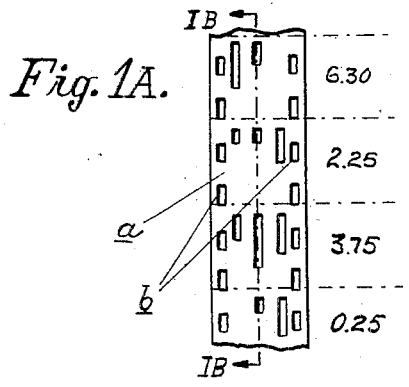
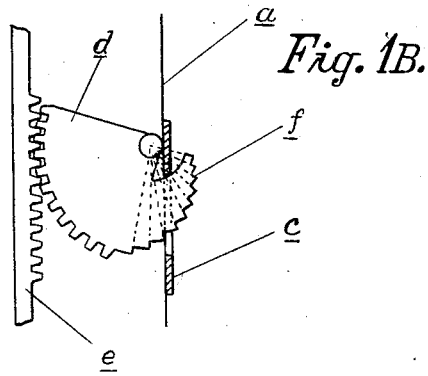
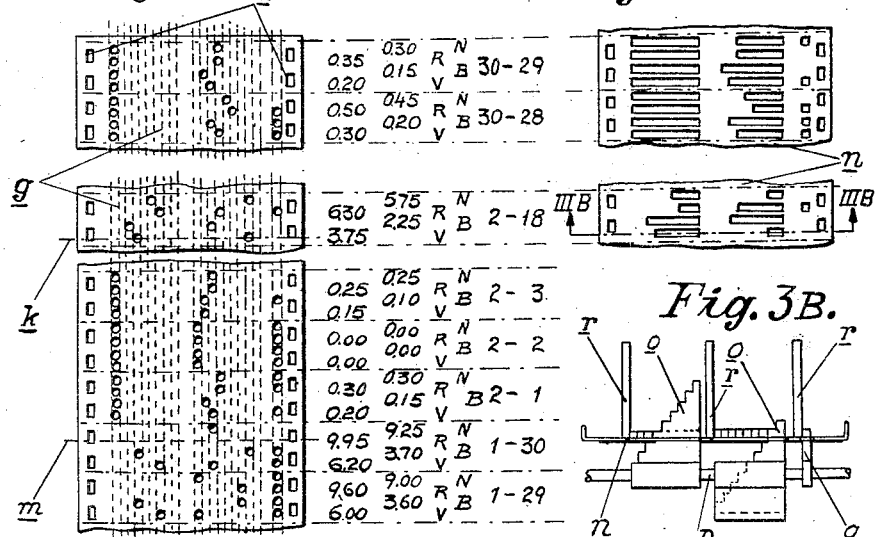
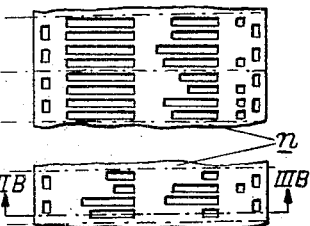
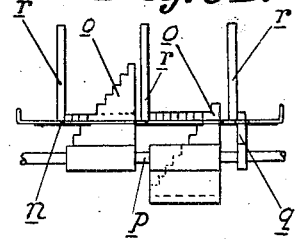
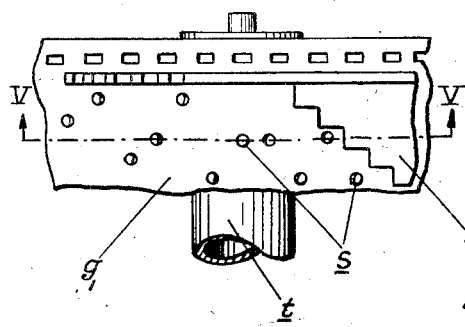
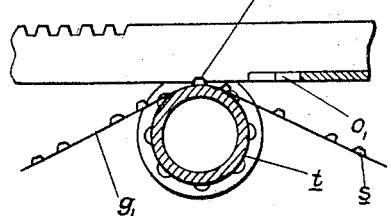
INVENTOR
Karl Gustaf Alfred Bäckdahl Aug. 15, 1939. K. G. A. BÄCKDAHL 2,169,213
TICKET PRINTING OR MARKING AND ISSUING APPARATUS
Filed Aug. 4, 1936 8 Sheets-Sheet 3

INVENTOR
Karl Gustaf Alfred Bäckdahl

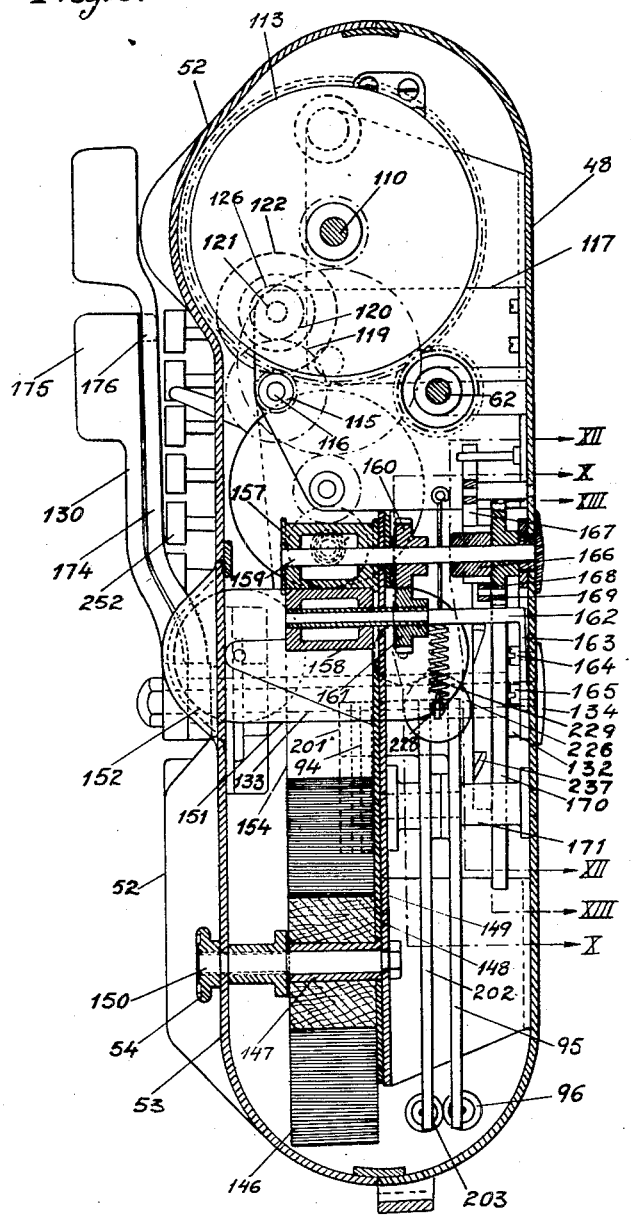

Aug. 15, 1939.   K. G. A. BÄCKDAHL   2,169,213
TICKET PRINTING OR MARKING AND ISSUING APPARATUS
Filed Aug. 4, 1936   8 Sheets-Sheet 5
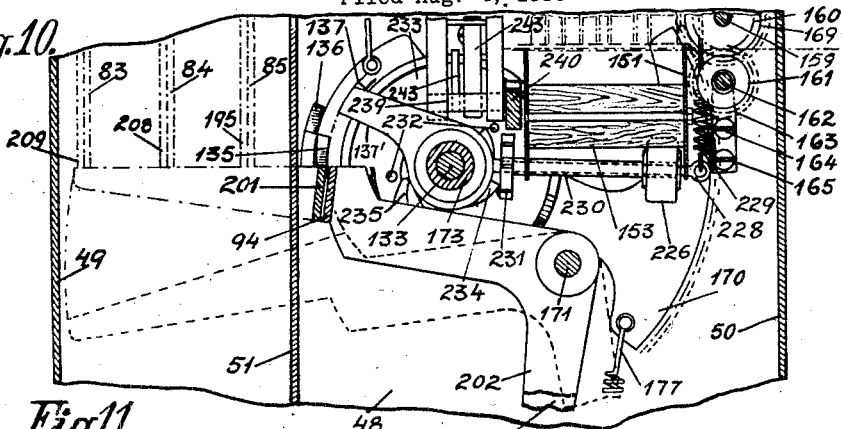
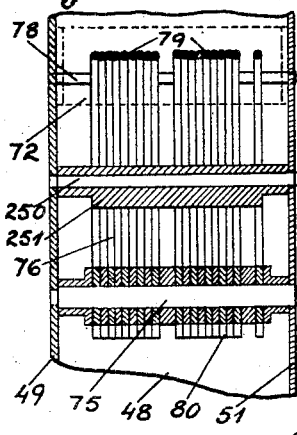
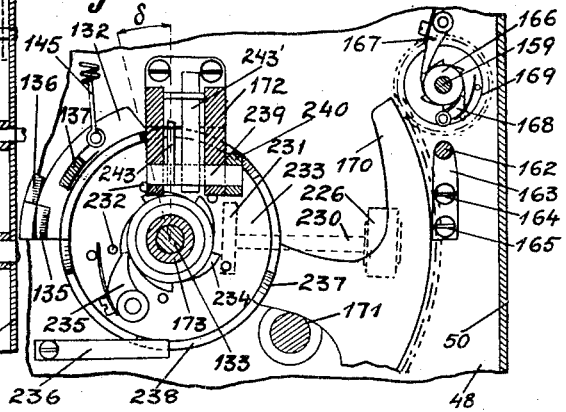
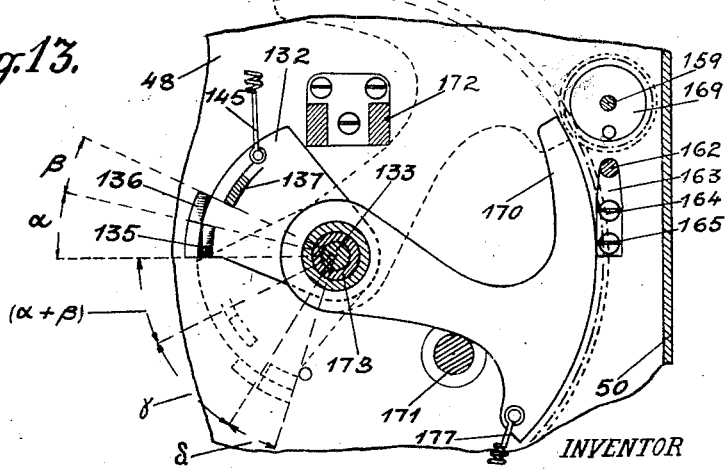
INVENTOR
Karl Gustaf Alfred Bäckdahl

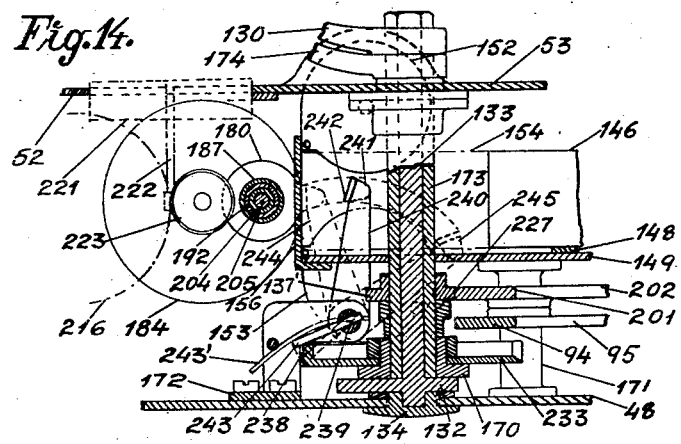
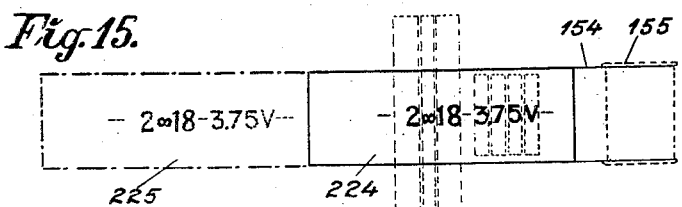
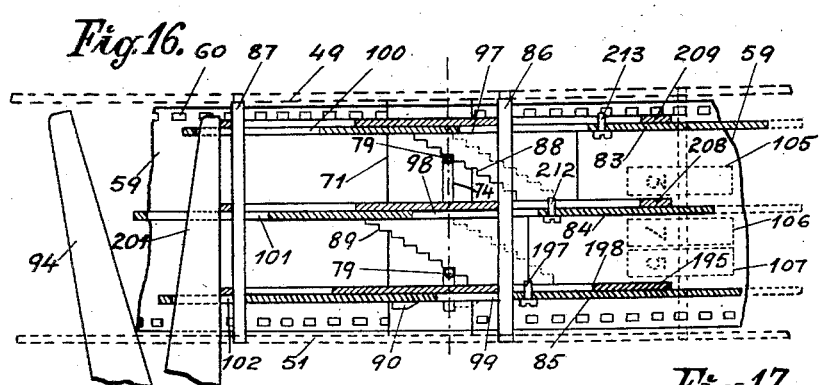
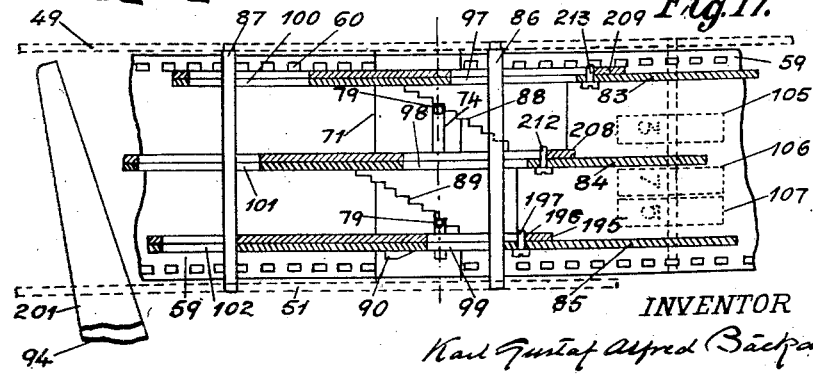

Aug. 15, 1939.    K. G. A. BÄCKDAHL    2,169,213
TICKET PRINTING OR MARKING AND ISSUING APPARATUS
Filed Aug. 4, 1936    8 Sheets-Sheet 7

INVENTOR
Karl Gustaf Alfred Bäckdahl

Aug. 15, 1939.   K. G. A. BÄCKDAHL   2,169,213
TICKET PRINTING OR MARKING AND ISSUING APPARATUS
Filed Aug. 4, 1936   8 Sheets-Sheet 8

INVENTOR
Karl Gustaf Alfred Bäckdahl

Patented Aug. 15, 1939

2,169,213

UNITED STATES PATENT OFFICE 2,169,213

TICKET PRINTING OR MARKING AND ISSUING APPARATUS

Karl Gustaf Alfred Bäckdahl, Stockholm, Sweden, assignor to Julia Bäckdahl, Stockholm, Sweden Application August 4, 1936, Serial No. 94,169
In Sweden August 14, 1934

13 Claims. (Cl. 101—69)

The present invention relates to apparatus for issuing receipts or tickets for the transportation of passengers or other similar fares.

Another object of the invention is to provide an apparatus which is adapted simultaneously with the printing of such a receipt or ticket to register the fare value, e. g., in a counter.

A further object of the invention is the provision of an apparatus which is provided with means for printing copies of the receipts or tickets issued for controlling and statistical purposes.

Other objects of the invention will appear hereinafter.

Particularly in the omnibus traffic which has expanded so enormously during the last few years ticket apparatus of the type described have come into use, especially on traffic lines having a great number of stations necessitating a considerable number of different ticket fares. For instance, in an omnibus line having 30 stations one has theoretically to figure with 30 times 29 different tickets, if the direction of travel is also to be marked on the ticket. Moreover, when in said line different fares are to be paid by adults and children and also both-way tickets and night-tickets are used the number of tickets will be four times greater, i. e. 3480 different tickets. Evidently, this great number of different fares cannot be held in mind by a fare-collector, but when collecting the fares he must to a great extent look up a price-list. Generally, it is impossible to have a supply of printed tickets for all fares in question. For this reason it has been proposed to use tickets which contain all fares of the price-list in tabular form, the price in question being punched or otherwise marked. In a line comprising, e. g., 3480 different fares such a ticket will, however, be too large and unhandy. For this reason it has been necessary either to issue receipts by hand or to print same by a ticket printing machine especially designed for this purpose, as a rule of the same type as a cash register but provided with a printing device for marking on the receipt or ticket of the number or denotation of the departure and destination stations and the character of the ticket, time of the journey and other data required for controlling and statistical purposes. On account of considerable weight and great dimensions such cash registers for train, omnibus and steamer lines could generally only be applied to stationary use so that their use is considerably limited. Furthermore, such apparatus has the inconvenience of the issuing of the tickets requiring much time, as the fare-collector must first look up the price-list to ascertain the fare and then set up a great number of keys for printing all those denominations and numerals to be contained on the ticket in which manipulation many errors may be committed. For this reason such ticket printing machines have not found any extended use, but instead attempts have been made to simplify the problem by dividing the traffic line into a few zones or fare stages each comprising a number of stations, enabling the use of a less number of previously printed tickets.

By means of the ticket issuing apparatus forming the subject matter of the present invention the above-mentioned drawbacks are substantially eliminated and further several important advantages are obtained. The apparatus according to the invention is so designed as to permit setting up the numbers or denominations of the departure and destination stations, the character of the ticket and the fare for any distance of transportation of the line by means of one single setting member, for instance a hand-wheel. The apparatus is so designed that by setting up a given station combination and a given character of the ticket a fare symbol on a fare sheet of the apparatus corresponding to said combination is simultaneously set into operative position. Then, the fare-collector has only to operate a lever to cause the apparatus to indicate the fare. When said fare has been collected another lever is operated causing the apparatus to print and eject a ticket containing denominations of departure and destination stations, character and fare of the ticket and, if desired, also time and other data required. Simultaneously, the fare value is registered in the counter of the apparatus and a copy of the ticket issued is printed.

In the following description and claims the expressions "fare sheet" and "fare strip" are intended to include any surface having marks or markings in the form of perforations, insections, embossments, depressions, recesses or the like which either by their shape or location on the sheet or strip or by a combination of both are adapted to form symbols designating the fare value.

The above-said mode of operation of the apparatus is effected according to the invention by the apparatus comprising a fare sheet having a fare symbol for each ticket combination which may occur on the traffic line for which the apparatus is designed. Preferably these fare symbols are in the form of perforations or recesses provided on a thin sheet or strip, for instance a strip of steel or Celluloid, said perforations or recesses representing by their shape or location or both in combination the numeral corresponding to the respective ticket fares. As said numerals contain, as a rule, a plurality of figures, such a fare or number symbol will generally consist of a plurality of perforations or recesses, for instance one perforation for each figure of the fare value. Preferably, the fare symbols are arranged on the fare sheet or strip in a predetermined order so that the setting of the apparatus for a given ticket combination causes the setting of the corresponding number symbol into operative position, that is, a position in which the number symbol is adapted to operate the members which indicate the ticket fare and to set the printing members for printing the ticket. When the fare sheet or strip carrying the fare symbols has the form of a thin strip of metal, Celluloid or similar material, the setting of a number symbol into operative position may be effected by moving the strip by a feeding roller provided with studs or pins adapted to engage holes in the strip, said holes being, as a rule, provided along the opposite edges of the strip. In setting, the strip is rolled off from a roller and rolled up on another. The feeding roller is connected with the setting hand-wheel, the latter being further connected with members showing the number symbol of the ticket combination which is in operative position and simultaneously setting the printing members corresponding to the station combination and the character of the ticket.

The perforations or recesses of the number symbols may, according to the invention, be adapted in operative position either to act directly as stops or abutments for the respective setting members for fare indication and printing, or to cooperate with stop or abutment members which in turn control the movement of said setting members.

The invention will be more fully described with reference to embodiments of same shown by way of examples in the accompanying drawings in which connection also other features characterizing the invention will be set forth.

In the drawings:

Figs. 1A to 3B, inclusive, show diagrammatically some different kinds of number symbols according to the invention arranged in the form of holes stamped out in thin strips;

Fig. 1A is a plan view of a fare strip;

Fig. 1B is a vertical longitudinal sectional view of said strip along the line IB—IB in Fig. 1A;

Fig. 2 shows three sections of a fare strip of another design;

Fig. 3A shows still another form of number symbols;

Fig. 3B is a sectional view along the line IIIB—IIIB in Fig. 3A;

Fig. 4 is a plan view of a fare strip having number symbols in the form of embossments;

Fig. 5 is a sectional view along the line V—V in Fig. 4;

Figure 6:
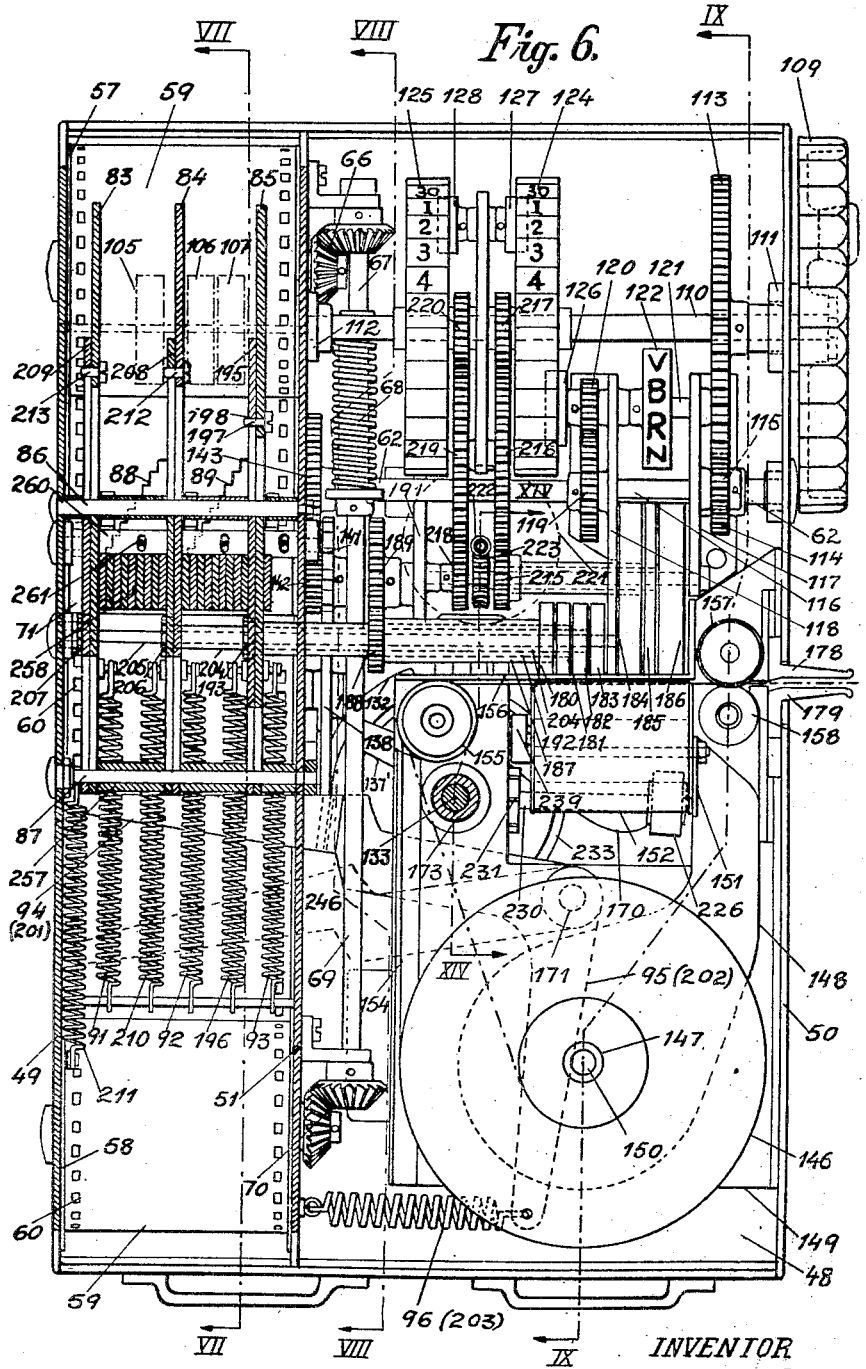
Figure 7:
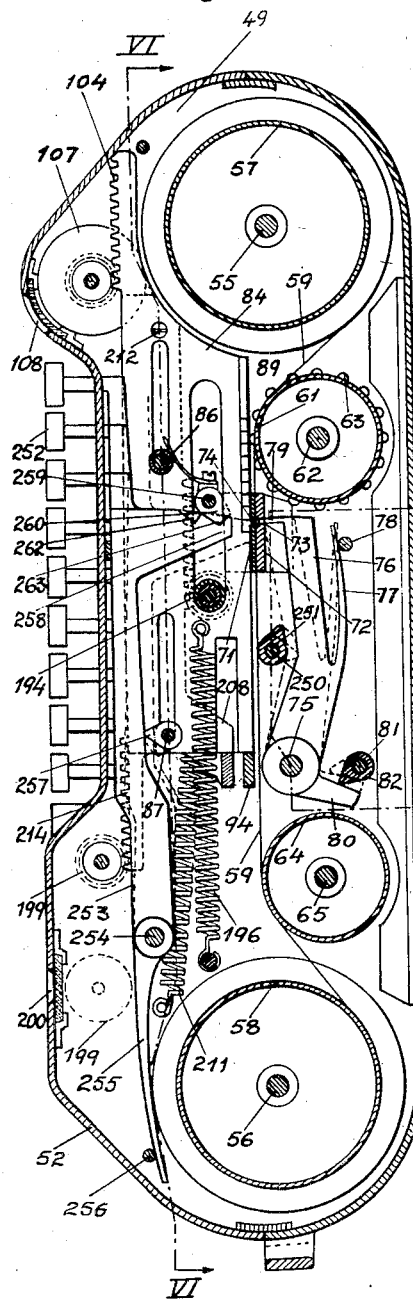
Figure 8:
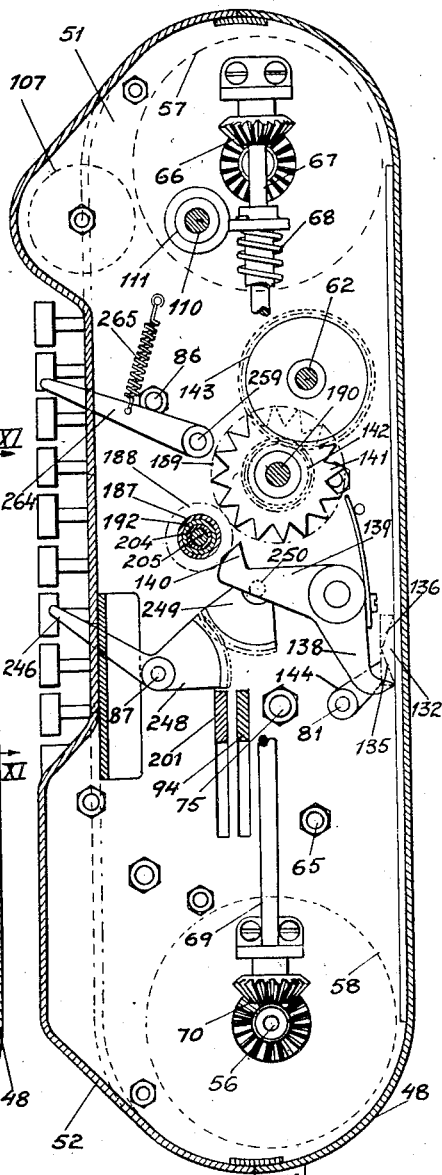
Figure 18:
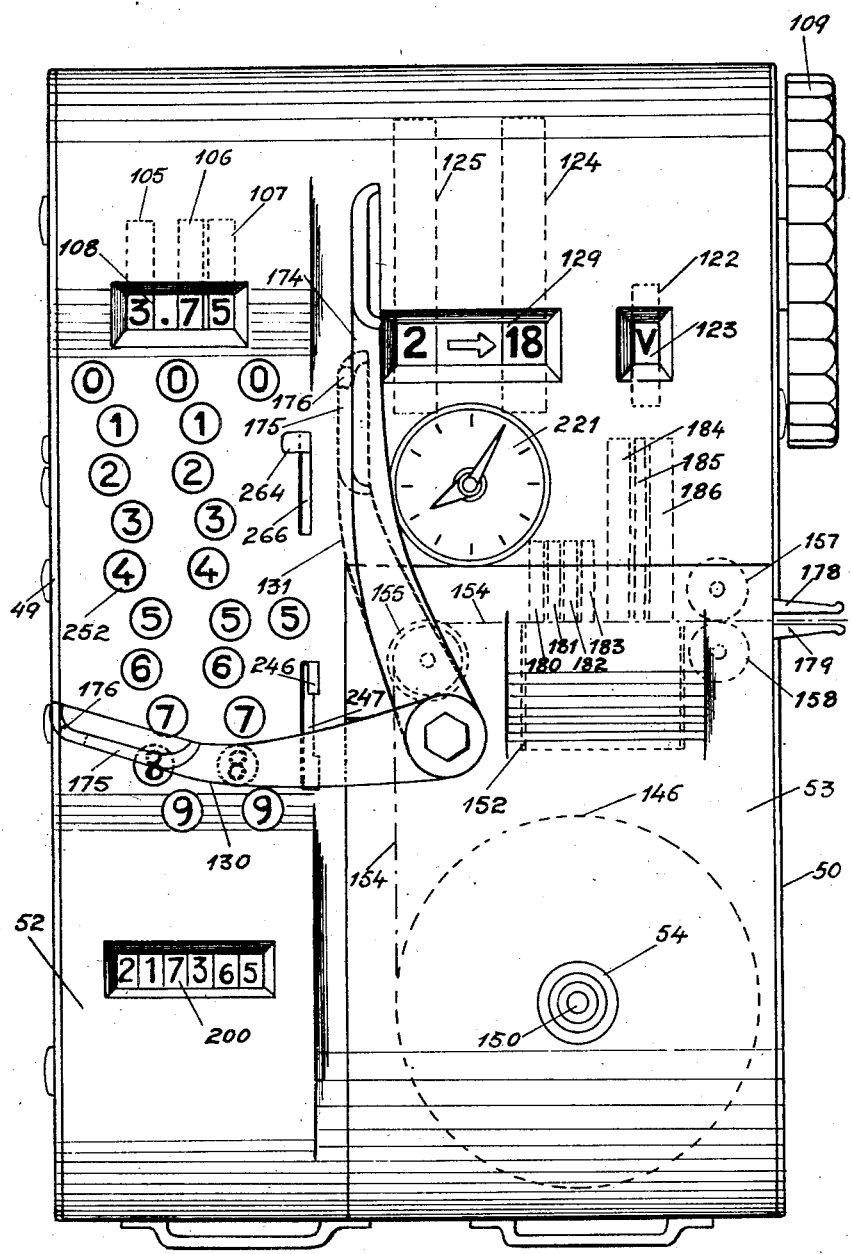
Figure 19:
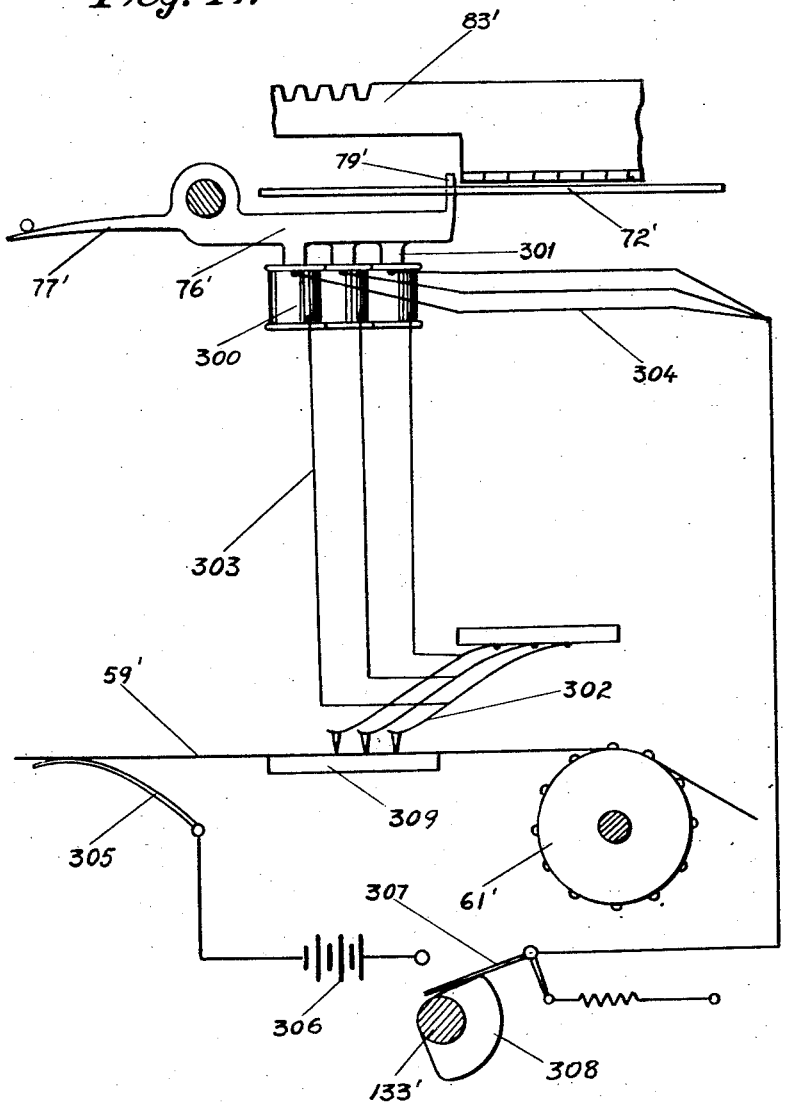

Figs. 6 to 18, inclusive, show by way of example an embodiment of a ticket printing and issuing apparatus according to the invention;

Fig. 6 is a plan view of the apparatus with the top or cover and the parts extending above the same removed and partly in horizontal section along the line VI—VI in Fig. 7;

Figs. 7, 8 and 9 are vertical longitudinal sectional views of the apparatus along the lines VII—VII, VIII—VIII and IX—IX in Fig. 6, respectively;

Figs. 10, 11, 12 and 13 are horizontal sectional views along the line X—X in Fig. 9, XI—XI in Fig. 7 and XII—XII and XIII—XIII in Fig. 9, respectively;

Fig. 14 is a vertical longitudinal sectional view along the line XIV—XIV in Fig. 6;

Fig. 15 is a diagrammatical view of the ticket strip of the apparatus in printing position and in ejected position;

Fig. 16 is a horizontal sectional view along the line VI—VI in Fig. 7 the fare indicating members and the printing setting members being shown in set and zero positions, respectively;

Fig. 17 is a horizontal sectional view along the same line in Fig. 7 of the fare indicating members and the printing setting members both in set postions;

Fig. 18 is a top view of the apparatus;

Fig. 19 shows diagrammatically a modification of the apparatus having electric means for operating the stops or abutments for setting the fare indicating member.

According to Figure 1A reference letter $a$ denotes a fare strip provided with edge holes $b$ for the feeding of the strip. Stamped out in the intermediate portion of the strip one after the other are number symbols each consisting of holes arranged side by side and representing by different length different figures. The holes in the vertical line to the right represent units, in this case the figures 0 and 5, holes being required only for the latter figure. The slots of the vertical intermediate line represent the tens 1 to 9, inclusive, and the line to the left the hundreds 1 to 9, inclusive. The numeral value of the different number symbols are shown at the right side of the strip.

In Fig. 1B $c$ designates a supporting plate disposed behind the fare strip $a$. In the figure the recess in the strip $a$ for the figure 7 in the number 375 is shown in operative position. As shown the lower edge of the perforation acts as a stop or abutment for a toothed segment $d$ engaging a rack $e$ forming the fare indicating member for the tens. The segment $d$ is provided with a stepped extension $f$ extending into the slot in the fare strip $a$ until the seventh step is stopped by the edge of the perforation. Consequently, the figure zero will need no perforation as in the zero position of the segment $d$ the end of the extension $f$ bears on the upper surface of the strip. In the embodiment of the number symbols shown in Figs. 1A and 1B the perforations act evidently directly as stops for the respective setting members.

According to Figure 2 a fare strip $g$ of another design is shown having also edge holes $h$. The number symbols of this fare strip represent only up to three-figured numbers the units of which consist only of 0 and 5. In this case the perforations for a number symbol consists of circular holes arranged on a line perpendicular to the longitudinal direction of the strip, the positions of said holes in transversal direction indicating the figures of the number. The nine rows on the left-hand side of the strip represent the hundreds 0 to 8, inclusive, the nine intermediate rows the tens 0 to 8, inclusive, and the row to the right the unit figure 0. The figure 9 of the hundreds and the tens and the figure 5 of the units are not represented by any holes, as in this case a stationary part of the apparatus may serve as a stop for these figures. When a number symbol is in operative position, as for instance the number symbol for 375 shown on line $k$, the symbol is adapted to co-operate with pins or studs movable through the respective hole from the underside of the strip thereby forming stops for corresponding setting members. In the embodiment shown there are nineteen such pins lying along the line $k$ and capable of being raised simultaneously as will be more fully described in the following.

In raised position the pins will under the action of springs press against the underside of the strip or be pushed through such perforations which are in operative position, respectively. The numeral values of the different number symbols, the character of the ticket (V=adults, B=children, R=both-way ticket and N=night ticket) and the denomination of the traffic distance of the ticket are shown to the right of the three sections of strip $g$. Observe, for instance, that the ticket fare for the distance 1 to 30, that is between the two end stations, is 9.95 (see line $m$) which number does not require any number symbol on the strip. Observe also that the imaginary distance 2 to 2 is also represented on the strip by four number symbols corresponding to zeros, it being necessary to include also such station combinations in order to permit a uniform feeding of the strip.

Fig. 3A shows a still further type of number symbols stamped out in a fare strip $n$ provided with edge holes. The two sections shown refer to the same fares as those on the upper sections of the strip $g$ in Fig. 2. In this case the hundreds and tens are determined by the transversal length of the perforations in such a manner that 0 is represented by a perforation of nine units of length, 1 by a perforation of eight units of length and so on. Consequently, 8 is represented by one unit of length, whereas 9 has no perforation for the reason set forth above with reference to the number symbols on strip $g$ in Fig. 2. With regard to the units 0 and 5 only 0 is represented by a perforation.

Fig. 3B is a vertical cross sectional view of the strip $n$ along the line IIIB—IIIB in Fig. 3A, said line representing operative position for the symbol of the number 375. According to Fig. 3B the perforations for the hundreds and tens of said number symbol act as abutments for two stopping members $o$ each consisting of a stepped cylindrical surface rotatable about a shaft $p$. The stopping member for the units consists of a pin $q$ rotatable about the same shaft $p$. In the position shown there is no perforation for the units corresponding to Figure 5. The stopping members $o$ and $q$ are adapted on the upper surface of the strip $n$ to act as abutments for setting members $r$, respectively, as will be more fully understood according as the description proceeds.

In the number symbols shown in Figs. 2 to 3B, inclusive, the perforations are adapted to co-operate with stopping members in the form of pins or the like which in turn serve as abutments for setting members for fare indication and printing. Consequently, in this case the number symbols co-operate indirectly with the latter members.

In the foregoing figures the fare strip or sheet has been provided with number symbols in the form of perforations. As mentioned above in sections, embossments, depressions or the like may be substituted for such perforations in the fare strip. An example of such a fare strip is shown diagrammatically in Figs. 4 and 5. In this embodiment according to the invention embossed studs $s$ on the fare strip $g_1$ serve as abutments or stops for a stepped plate $o_1$, said strip $g_1$ being angularly guided over a feeding roller $t$ so as to cause the strip $g_1$ to travel over said roller $t$ in such a manner that only one row of embossments $s$ at a time is brought into engagement with the stepped plate $o_1$.

By means of fare strips of the type described with reference to Figs. 1A to 5, inclusive, it is possible to provide a ticket issuing apparatus according to the present invention with number symbols for up to five or six thousand ticket combinations. Particularly, when the fare strip is made according to the principle illustrated in Fig. 2 it may be made out of an extremely thin metal strip, for instance a hardened steel strip of a thickness of 0.05 to 0.06 millimeter, requiring feeding rollers of an external diameter of only 55 to 60 millimeters. Each number symbol only requires 2 to 3 millimeters of the length of the strip, as the diameter of the holes may be limited to 1 to 1.5 millimeters.

If desired, the ticket issuing apparatus according to the present invention may also be so designed that the fare strip may be disconnected from the fare indicating and printing mechanism, in which case said mechanism may be adapted to co-operate with stopping members to be set by keys or levers of the type used in calculating machines. This arrangement involves the important advantage that the apparatus may be used for issuing tickets for all station combinations of arbitrary prices, for instance for transportation of goods, special tourists or school journeys and the like.

Tickets issued by the present apparatus may preferably be printed on a ticket strip or ticket blanks provided in the apparatus. The printing may be effected in any known suitable manner, for instance by a carbon ribbon, inking pad or the like. It is obvious that the printing mechanism may also be adapted for printing ticket blanks fed into the printing mechanism from the outside, for instance through a slot in the casing of the apparatus in any known suitable manner. When a carbon ribbon is used, said ribbon may consist of a paper strip coated with printer's ink or the like which strip is fed forward for each printing operation in such a manner that a non-used portion of the carbon strip comes into use for the printing of the next ticket. In this case the carbon strip will form a negative copy of all tickets issued in the order in which they have been printed which copy may be easily read off, for instance by means of a mirror.

Ticket issuing apparatus according to the present invention involve further the advantage that their weight is very low and their external dimensions very small. So for instance an apparatus for up to 6000 ticket combinations may be built of a weight not exceeding three or four pounds and of external dimensions of about 9 x 6 x 3 ins. Thus, it is possible to build the apparatus portable, for instance to be carried by the fare-collector attached to his belt.

The ticket issuing apparatus shown in Figs. 6 to 18, inclusive, is a portable apparatus designed for a traffic line with 30 stations designated by numbers 1 to 30, inclusive. The apparatus is designed for issuing four different kinds of tickets for every possible station combination, viz. one-way tickets for adults and children, denoted by V and B, respectively, and both-way and night tickets for adults, denoted by R and N, respectively. The ticket fare values end with either 0 or 5, and the highest ticket fare value which can be registered by the apparatus is 9.95.

The apparatus is provided with a fare strip of hardened carbon steel of a thickness of 0.06 millimeter and a width of 45 millimeters, three sections of the strip being shown in Fig. 2 and described with reference to this figure with regard to its number symbols according to the principle of the present invention.

The casing of the apparatus comprises a bottom plate 48 the short sides of which are turned up in quarto-cylindrical form, and vertical side plates 49 and 50 screwed by flanges to the long sides of said bottom plate. The bottom plate serves as support for a plurality of the devices of the apparatus, and the side walls 49 and 50 are formed as brackets or carriers for several of said devices and for this purpose these parts are made of relatively thick plate, for instance of aluminum. Secured to the bottom plate 48 is a vertical partition 51 extending in parallel to and having the same form as wall 49. The top of the apparatus consists of a cover comprising a part 52 bearing on flanges along the upper edges of walls 49 and 50 and partition 51 and permanently secured to the casing, and an easily removable part 53 bearing on the edges of part 52 and on side wall 50 and secured in position by means of a screw 54 (see Figs. 9 and 18).

Journalled in the walls 49 and 51 perpendicularly thereto and at opposite ends of the casing are two shafts 55 and 56 (see Figs. 7 and 8) carrying each a flanged roller 57 and 58, respectively, adapted to receive the fare strip 59 (see Figs. 6 and 7) which at its ends is secured to said rollers. Along both of its edges the strip 59 is provided with feeding holes 60. The fare strip 59 passes over a feeding roller 61 secured to a shaft 62 which is journalled in bushings in the walls 49 and 50 and the partition 51. Along both of its edges roller 61 is provided with spurs 63 (see Fig. 7) engaging exactly into the edge holes 60 of the fare strip 59. The fare strip passes over another roller 64 of the same diameter as roller 62 and rotatable on a shaft 65 secured to wall 49 and partition 51. By means of a bevel gearing 66, shaft 67, coil spring 68, shaft 69 and bevel gearing 70 shaft 55 of the fare strip roller 57 is connected with shaft 56 of the roller 58. On account of the shafts 67 and 69 being resiliently connected by means of coil spring 68 the fare strip 59 is always kept stretched between the two rollers, said spring further compensating the difference in the angular speed of the rollers, when a greater portion of the fare strip is rolled up on the one roller than on the other. The portion of the fare strip 59 between the feeding roller 61 and roller 64 extends between upper and lower plates 71 and 72, respectively, situated close by the upper and lower surfaces of the fare strip, respectively, out of contact with said strip (see Fig. 7). A narrow slot 73 is provided in plate 72 perpendicularly to the edges of strip 59, said slot registering with a slot 74 in plate 71 of the same length and width. The width of slots 73 and 74 is equal to the diameter of the holes of the number symbols stamped out in the fare strip 59, and the length of the slots is equal to the greatest length of such a number symbol, that is the number symbol for 000. Secured to the walls 49 and 51 perpendicularly thereto is a shaft 75, and loosely journalled on said shaft are nineteen bell crank levers 76 (see Figs. 7 and 11). These levers 76 are each stamped out from spring steel blanks in one piece with a spring 77 projecting therefrom (see Fig. 7) and bearing on a rod 78, said spring tending to move the lever towards the strip 59. Extending tangentially upwards from the outer end of each of levers 76 is a narrow pin 79 of circular cross section and having a flattened end. The nineteen pins 79 engage slot 73 in plate 72. The levers 76 have each a downwardly projecting smaller arm 80 bearing on a cam 82 provided on a shaft 81. By rotating shaft 81 the cam 82 may be moved laterally causing the pins 79 to be moved towards the lower surface of the fare strip 59 by the action of the springs 77. On such places where the fare strip is provided with holes of a number symbol the pins pass through the strip and slot 74 in plate 71 so as to project some millimeters beyond said plate. As shown in Fig. 11 the levers 76 are arranged in three groups, the left-hand and intermediate groups containing each nine levers and the right-hand group only one lever. The first-mentioned two groups are situated immediately below the perforations in strip 59 representing the hundreds and tens, respectively, and the right-hand lever is disposed exactly below the perforations representing the unit figure 0. When the pins 79 are released by the rotation of shaft 81, only one pin of each group will, consequently, pass through the fare strip and project through plate 71. These projecting pins serve as abutments for three fare indicating members 83, 84 and 85, respectively, (see Figs. 6, 7, 16 and 17) which are displaceably supported by transverse rods 86 and 87 arranged between the walls 49 and 51 perpendicularly thereto. The fare indicating members 83, 84 and 85 correspond to members r shown in Fig. 3B.

The three fare indicating members 83, 84 and 85 are arranged in parallel to each other, 83 being situated to the left and 84 above the centre line of strip 59. Both of said members are stamped out from sheet steel of a thickness of about 1.5 millimeters and have along their lower edge situated close by the plate 71 perpendicularly projecting stepped plates 88 and 89, respectively (see Figs. 6, 16 and 17). The number of the steps of each of the plates 88 and 89 is nine and their width, measured perpendicularly to the edges of the fare strip 59 is equal to the diameter of the stamped holes of the number symbols, i. e., about 1.5 millimeters. The height of the steps in the longitudinal direction of the strip is somewhat greater (equal to the longitudinal distance between two number symbols=2.5 millimeters). Provided on the fare indicating member 85 at the lower edge thereof is only one perpendicularly projecting shoulder 90 (see Figs. 16 and 17) of the same width as that of the holes of the number symbols (=1.5 millimeters). The nine steps on each of the plates 88 and 89 as well as the shoulder 90 are adapted to serve as abutments in cooperation with the pins 79 passing through the holes of the number symbol which is in operative position, i. e., when its holes exactly register with the slots 73 and 74.

The fare indicating members 83, 84 and 85 are each adapted to be displaced in one direction by a spring 91, 92 and 93, respectively (see Fig. 6) and are maintained in their starting position by a bell crank lever rotatable about a shaft 171 perpendicular to the bottom plate 48, one arm 94 of said lever bearing on the ends of said members, whereas its other arm 95 projecting perpendicularly to arm 94 is actuated by a coil spring 96 of a strength sufficient to overrule the action of springs 91, 92 and 93. The fare indicating members 83, 84 and 85 are each provided with a longitudinal slot 97, 98 and 99, respectively, through which rod 86 passes. Rod 87 engages similar slots 100, 101 and 102, respectively, in said members (see Figs. 16 and 17). In the starting position above described rods 86 and 87 bear on the ends of said slots, the opposite ends of the slots in the fare indicating members 83 and 84 forming stops for said members in the position corresponding to the Figure 9, whereas the opposite end of the slots in the member 85 forms stops for said member in the position corresponding to the Figure 5. For this reason no holes are required in the fare strip for said two figures. At their one end the fare indicating members 83, 84 and 85 are provided with racks 104 (Fig. 7) engaging gear wheels each connected with a fare indicating figure wheel 105, 106 and 107, respectively, the setting of which can be read off through a glass-protected sight opening 108 in the cover of the apparatus (see Fig. 18).

The setting of the fare strip 59 for a given ticket combination to obtain the ticket fare corresponding thereto is effected by means of the following means: Fare strip 59 is set by means of a setting hand-wheel 109 which is rigidly secured to a shaft 110 (see Figs. 6 and 9) journalled in bushings 111 and 112 secured to walls 50 and 51, respectively. Secured to shaft 110 is a gear wheel 113 engaging a pinion 114 rigidly secured to shaft 62 of feed roller 61. When hand-wheel 109 is rotated through a full revolution fare strip 59 is displaced by feed roller 61 through a length exactly corresponding to 120 number symbols, that is four number symbols for each of the thirty stations of the line. Further, gear wheel 113 meshes with a pinion 115 secured to a shaft 116 which is journalled in two brackets 117 and 118 fixed to the bottom plate 49. Another gear wheel 119 fixed to shaft 116 engages a pinion 120 secured to a shaft 121 which is also journalled in the brackets 117 and 118. Fixed to shaft 121 is a letter wheel 122 on the cylindrical surface of which the letters for the class of ticket, vis., V, B, R and N, are applied twice with an angular space between the letters of 45°. The ratio of transmission between hand-wheel shaft 110 and shaft 121 is 1:15, i. e., a rotation of hand-wheel 109 of one-thirtieth of a revolution causes wheel 122 to be rotated through half a revolution corresponding to four letters. The setting of letter wheel 122 is read off through a glass protected sight opening 123 in the cover of the apparatus (see Fig. 18).

Rotatably mounted on hand-wheel shaft 110 are two station number wheels 124 and 125 (see Fig. 6) carrying on their cylindrical surface the thirty station numbers in uniformly spaced relation. Number wheel 124 for indicating the number of the destination station corresponding to the number symbol which is in operative position is adapted to be fed stepwisely through one-thirtieth of a revolution for each rotation of half a revolution of letter wheel 122. This is effected in the same manner as tens transfer in counters or the like by means of a transmission wheel 126 mounted on shaft 121 and carrying two diametrically opposed pins. Number wheel 125 for indicating the departure station corresponding to the number symbol which is in operative position is adapted by means of transmission wheels 127 and 128 to be fed stepwisely through one-thirtieth of a revolution, i. e., one station number for each complete revolution of number wheel 124. The station numbers on number wheels 124 and 125 may be read off through a glass-protected sight opening 129 in the cover of the apparatus (see Fig. 18).

In Fig. 18 there appear in the sight openings 123 and 129 on the cover of the apparatus the ticket class letter V, the departure station number 2 and the destination station number 18, thereby indicating that the number symbol for a one-way ticket for an adult (V) for a journey between departure station 2 and destination station 18 is in operative position. In order to establish the fare corresponding to this ticket combination a lever 130, hereinafter termed "the fare lever", arranged on the top of the apparatus (see also Figs. 9 and 14) is moved to the position shown by full lines in Fig. 18 from the starting position shown by dotted lines at 131 in the same figure, causing rotation of a cam disk 132 secured to the lower end of the shaft 133 of lever 130 which shaft at this end is journalled in a bushing 134 (see Figs. 8, 9, 12, 13 and 14). This results in the axially acting oblique cam surfaces 135 and 136 on disk 132 being brought into function in the order now mentioned. In Fig. 13 cam disk 132 is shown in starting position, and the angles α and β corresponding to the cam surfaces 135 and 136, respectively, are indicated above the line denoting the starting position. During the first portion of the rotation of fare lever 130 corresponding to angle α (=13°, see Fig. 13) the oblique cam surface 135 will raise a lever 138 (Fig. 8) causing bell crank lever 139 connected with said lever 138 to engage with its wedge-shaped end 140 the space between two consecutive teeth on a toothed wheel 141 so as to set said wheel and lock same in an exact given position. Toothed wheel 141 is rigidly connected with gear wheel 142 which in turn meshes with a gear wheel 143 on shaft 62 of feed roller 61. The ratio of transmission between wheels 142 and 143 is such that a rotation equal to the angle between two consecutive teeth of wheel 141 corresponds to a feeding movement of fare strip 59 through a length corresponding to the distance between two consecutive number symbols. The setting of toothed wheel 141 above described evidently effects a setting to a nicety of the number symbol for the ticket combination 2–18V which was before approximately set by means of hand-wheel 109, an exact setting by said hand-wheel being practically impossible or requiring at all events an unduly long time. By the arrangement above described the advantage is gained that no exact setting of the ticket combination is required by means of hand-wheel 109 as such exact setting and locking of the fare strip is effected during the first portion of the rotation of the fare lever 130 through the angle α. During the following portion of the rotation of said lever, viz. through the angle β (=12°, see Fig. 13), the oblique cam surface 136 will permit a lever 144 secured to shaft 81 and previously raised onto disk 132 to be lowered under the action of the tension of springs 77 (see Fig. 8), levers 76 being thereby moved towards the lower surface of fare strip 59 causing such pins which are registering with holes in the exactly set number symbol to protrude through said holes and form stops on the upper surface of plate 71. When the number symbol of the ticket combination 2–18V is in operative position a pin for the figure "3" in the hundreds group and a pin for the figure "7" in the tens group will be moved through their respective holes in the fare strip. The pin for the unit group will not protrude through the strip as in this case the unit figure is "5" for which figure the rods 86 and 87 form stops as mentioned above. On continued rotation of fare lever 130 through a further angle γ (=32°, see Fig. 13) a pin 137 on cam disk 132 will rock lever 94 against the action of spring 96 causing release of the fare indicating members 83, 84 and 85 which are then by their springs 91, 92 and 93, respectively, displaced into the position in which they are stopped by their respective abutment. On member 82 the stepped plate 88 will strike the pin corresponding to figure "3" of the hundreds. The stepped plate 89 of member 84 will strike the pin corresponding to figure "7" of the tens, and member 85 will be stopped by rods 86 and 87 in the position of the unit figure "5". This will cause the racks 104 to set the fare indicating wheels 105, 106 and 107 into such positions that the number "375" is shown in the sight opening for the ticket fare (see Fig. 18). Fare lever 130 is returned into starting position (131) by a coil spring 145 actuating cam disk 132 (see Figs. 10, 12 and 13).

The printing of a ticket as well as a copy thereof and the registering of the fare value in the counter of the apparatus is effected by the aid of the following means. A paper strip for the tickets is arranged in the apparatus in the form of a roll of paper 146 (see Figs. 6, 9 and 18) rotatably mounted on a tubular sleeve 147 which is secured to a plate 148. This plate rests on a supporting plate 149, and projecting from this supporting plate is a bolt 150 on which the sleeve 147 is mounted, a screw 54 for the fixation of the cover 53 being threaded on said bolt. Plate 149 also supports carriers 151 for the two carbon ribbon rollers 152 and 153. From paper roll 146 which in the apparatus shown is dimensioned for about 1000 tickets of a length of 53 millimeters and a width of 18 millimeters the ticket strip 154 passes over guiding roller 155, therefrom close along a printing table 156 and further between two rollers 157 and 158. Fixed to a shaft 159 of roller 157 is a gear wheel 160 meshing with a gear wheel 161 rigidly secured to roller 158 and together with said roller rotatably mounted on a shaft 162 having its foot 163 resiliently fixed on bottom plate 48 by means of screws 164 and 165 (see Figs. 9 and 10). The pressure of roller 158 on roller 157 may be adjusted by varying the tightening of screw 164. Fixed to shaft 159 of roller 157 is a ratchet wheel 166 (see Fig. 12) and engaging said wheel is a pawl 167 preventing rotation of roller 157 in the direction opposite to that of ejection. Meshing with ratchet wheel 166 in a lower plane is another pawl 168 fixed to a gear wheel 169 (see also Fig. 13) which is rotatably mounted on shaft 159 and engages a toothed segment 170. Thus, rotation of said toothed segment will actuate roller 157 only in the feeding direction of the ticket strip 154. The angle of rotation of the toothed segment 170 is limited in the one direction by the pivot 171 of lever 95 and in the other direction by the frame 172 of the printing hammer. The toothed segment 170 is secured to a tubular shaft 173 rotatably mounted about shaft 133 of cam disk 132 and provided on the top of the apparatus with an operating lever 174 which is longer than fare lever 130 and situated immediately below same (see Figs. 9, 14 and 18). When a ticket is to be printed, registered and ejected, this lever 174 which in the following will be termed "the ticket lever" is turned to the left (see Fig. 18) through an angle =72° determined by the above-said stops 171 and 172 of the toothed segment 170, thereby bringing with it fare lever 130 by means of a stud 176 projecting from the finger grip 175 of the latter. Ticket lever 174 is adapted to be returned to its starting position by a coil spring 177 actuating the toothed segment 170 (see Figs. 10 and 13). The ejection of the printed end of the ticket strip 154 and the feeding of a fresh portion thereof into printing position take place during the entire return movement of the ticket lever. The ejected ticket is cut off by pressing the finger grip 178 and a sharp edge thereon situated close to the feeding roller 157 towards the grip 179, the ticket thus cut off being clamped between said last-mentioned parts 178 and 179 to be then drawn off straight outwards from the apparatus.

The means for the printing of the ticket comprise seven type wheels 180 to 186, inclusive, arranged adjacent one another (see Figs. 6 and 18). The first four of these wheels have a smaller diameter than the other and are each secured on a separate shaft, which shafts are arranged the one within the other. In horizontal direction these shafts are disposed in parallel to the printing table 156, the printing wheels engaging slots in said table so as to cause the printing surfaces of the types to protrude about half a millimeter above the plane of the printing table. Around its external cylindrical surface the type wheel 180 situated nearest to the left carries printing types for the letters V, B, R and N to designate the class of the ticket. These types which occur twice are disposed at an angular distance from each other of 45°. The shaft 187 of the outermost typewheel 180 carries at its opposite end a gear wheel 188 meshing with a larger gear wheel 189 on the shaft 190 of toothed gear 141, said shaft being mounted in a bracket 191 and wall 51 and connected with the hand-wheel shaft 110 via gears 142, 143 and 114, 113. The ratio of transmission between said shaft 110 and shaft 187 of the type wheel 180 is 1:15, that is a rotation of the hand-wheel shaft of one thirtieth of a revolution corresponds to a rotation of the type wheel 180 of half a revolution, corresponding to four letters. Thus, on setting the fare strip by means of the hand-wheel 109 type wheel 180 is rotated through exactly the same angles as the letter wheel 122. The types of the type wheel 180 are so arranged that the same letter which appears in the sight opening 123 is in printing position immediately above the plane of the printing table 156. The type wheel 181 lying nearest to the right of type wheel 180 and having its tubular shaft 192 situated immediately within shaft 187 refers to the unit figures of the fare and carries, consequently, the types 0 and 5 in diametrically spaced relation. Shaft 192 extends through a hole in wall 51 and carries at its opposite end a gear wheel 193 meshing with a rack (not visible in the drawings) on a setting member 195 displaceably mounted on the rods 86 and 87 (see Figs. 6, 16 and 17), said setting members bearing on the fare indicating member 85 and being adapted to be displaced by a spring 196 through exactly the same length as member 85, a pin 197 being screwed into said last-mentioned member 85 and serving as stop for one end 198 of the slot through which the rod 86 extends. The setting member 195 is provided with still another rack 214 (see Fig. 7) adapted to feed the unit wheel of a counter (indicated in Fig. 7 by wheels 199) in one direction so as to cause the number set up to appear in a sight opening 200 situated on the top of the apparatus (see Fig. 18). The setting member 195 is adapted to be retained in its starting position shown in Figs. 6 and 16 by a bell crank lever 201 (see Fig. 14) of the same shape as lever 94 and rotatably mounted on pin 171 above the latter. A perpendicularly projecting arm 202 of lever 201 is actuated by a coil spring 203. The type wheels of the tens and hundreds 182 and 183, respectively, are fixed on the shafts 204 and 205, respectively, shaft 204 being tubular and arranged around the solid shaft 205. The type wheels 182 and 183 are each provided with printing types for the ten figures 0 to 9, inclusive, spaced evenly around the cylindrical external surfaces of said wheels. At its opposite end each of shafts 204 and 205 carries a gear wheel 206 and 207, respectively, meshing with a rack on the setting members 208 and 209, respectively, arranged along the corresponding fare indicating members 84 and 83 and as the latter displaceably supported by rods 86 and 87 which engage slots in the members 208 and 209. These members are adapted to be displaced under the action of springs 210 and 211, respectively, pins 212 and 213 screwed into the members 84 and 83 serving as stops for the end edges of slots in said members 208 and 209 (see Figs. 6, 16 and 17). Similar to the setting member 195 the setting members 208 and 209 are at their ends provided with racks 214 (see Fig. 7) adapted in one direction to feed the tens and hundreds figure wheel of the above said counter, respectively, for setting and tens transfer. The rack with which the gear 206 on shaft 204 meshes is shown in Fig. 7 by dotted lines at 194. The corresponding racks on the setting members 195 and 209 engaging wheels 193 and 207, respectively, are arranged in an analogous manner. In the positions occupied by the setting members 195, 208 and 209 as shown in Figs. 6, 7 and 16 the corresponding type wheels 181, 182 and 183 are set in such positions that their zeros are in printing position. The setting of the above said setting memoers into the positions shown in Fig. 17 corresponding to the positions of the above said type wheels for the printing of the fare numeral 3.75 is effected by turning the ticket lever 174 to the left causing a lever 137' extending radially from tubular shaft 173 to actuate lever 201 which in turn releases the above said setting members. At the same time the fare value 3.75 will be registered in the counter of the apparatus.

Of the three larger type wheels 184, 185 and 186, wheels 184 and 186 are adapted to print the numbers of the 30 destination and departure stations, respectively. Via gear wheels 215, 216 and 217 the type wheel 184 is connected with number wheel 124, with a ratio of transmission of 1:1 in such a manner that the number of the destination station shown in the sight opening 129 (see Fig. 18) is the same as that which is in printing position on the type wheel. In analogous manner the type wheel 186 is by means of gear wheels 218, 219 and 220 connected with the number wheel for the number of the departure station. The somewhat narrower type wheel 185 is adapted for printing on the ticket of the hour at which the ticket is issued. For this reason this type wheel is adapted to be fed through one twenty-fourth of a revolution by a clock 221 sunk into the cover 52 of the apparatus (see Figs. 6, 14, 15 and 18), a vertical shaft 222 extending from the minute hand of said clock and adapted to actuate a wheel 223 on the shaft of the type wheel 185.

In Fig. 15 a diagrammatic view is shown of a ticket 224 in printing position on which those data are printed which correspond to the setting of the apparatus as shown in Fig. 18, viz.— 2∞18—3.75 V—. As shown, the figure designating the hour is printed in horizontal position in order not to be confounded with the station numbers. The dots as well as the decimal point derive from types on the printing table which, of course, may be provided with further permanent symbols. If desired, the printing mechanism may also be provided with a type wheel fed forward by the ticket lever for printing running numbers on the tickets as well as with types for date, vehicle number and number of fare-collector and traffic line or the like arranged in any known suitable manner. The ticket 225 shown by dotted lines in Fig. 15 shows the ticket 224 in ejected position.

The inking member of the printing mechanism consists of a carbon ribbon in the form of a strip of carbon paper of the same kind as that used for obtaining copies on a typewriter. From the beginning this carbon ribbon is rolled up on the upper carbon ribbon roller 152 and its free end is drawn between the printing table 156 and the ticket strip 154 with the ink coated surface towards the latter and fixed to the lower carbon ribbon roller 153 on which the ribbon is adapted to be rolled up through a certain length after each printing operation. This feeding of the carbon ribbon is effected by means of a rubber coated roller 226 bearing on the surface of the carbon ribbon coiled up on the lower roller 153 and rotatably mounted on a spindle 228 projecting radially from the sleeve 227 on shaft 173 (see Figs. 10 and 14). Secured to the outer end of spindle 228 is a coil spring 229 by means of which the rubber roller 226 is pressed strongly against the ribbon on the roller 153. The rubber roller 226 is fixed on a tubular shaft 230 rotatably mounted on spindle 228 and carrying at its opposite end adjacent the sleeve 227 a toothed wheel 231 (see Figs. 10 and 12) adapted to be fed forward through one tooth for every ticket printed by the actuation of vertical pins 232 projecting upwards from a circular disk 233 rotatably mounted on the hub of the toothed segment 170. The disk 233 is adapted to be rotated in the one direction through one-fifth of a revolution (=72°), when the ticket lever 174 is moved from its starting position until it is stopped by the abutment 172 of toothed segment 170. This rotation of disk 233 is effected by a ratchet wheel 234 secured to the shaft 173 of the fare lever and having five ratchet teeth adapted to co-operate with a pawl 235 secured to disk 233. The disk 233 is prevented from rotation in opposite direction by a spring-actuated locking member 236 adapted to engage one of five triangular notches 237 provided in an axially projecting edge flange 238 of disk 233 at a distance of one-fifth of a revolution from each other, said notches 237 also effecting the release of the hammer of the printing mechanism (see Figs. 10, 12 and 14). This hammer consists of an arm 240 projecting radially from a shaft 239 which is journalled in the frame 172, said arm carrying at its free end a perpendicularly extending arm 241 provided with a plane printing pad 242 of rubber or similar suitable material adapted to strike the back of the portion of the ticket strip 154 which is in printing position in front of the seven type wheels. Extending radially through shaft 239 of the printing hammer is a pin 243 bearing with its point on the upper edge of flange 238, when the printing hammer is in non-released position as shown by full lines in Fig. 14. The release of the printing hammer is effected by the pin 243 falling down onto the bottom of one of the notches 237. This occurs at the moment when the ticket lever has fully released levers 94 and 201, i. e. when it has been turned from its starting position through an angle equal to the sum of the angles α, β and γ (see Fig. 13). At this moment all of the members are set for printing of a ticket. On the release of the printing hammer its surface 242 strikes strongly the back of the ticket strip under the action of a leaf spring 243' extending radially from shaft 239, the hammer then occupying the position shown by dotted lines in Fig. 14 and denoted by 244. During the continued rotation of the ticket lever 174 through the remaining angle δ (=15°, see Fig. 13) pin 243 is raised again by the oblique surface of the notch 237 so as to bear on the upper edge of flange 238, the printing hammer being removed from the printed ticket the ejection of which begins at the moment when the return movement of the ticket lever sets in and continues during the whole of this movement. When the carbon ribbon as well as the paper roller 146 simultaneously are to be replaced, the printing hammer is turned into the position shown in dotted lines at 245 in Fig. 14, whereupon the carbon ribbon rollers 152 and 153 which are connected by plates 151 and 148 into a carrier also supporting the paper roller 146 may be simultaneously lifted, the cover 53 having previously been removed.

According to the invention the used portion of the carbon ribbon is adapted to be employed as a copy of all of the printed tickets for controlling and statistical purposes. For this reason the carbon ribbon is adapted to be fed in such manner between two consecutive ticket printing operations that a non-used portion of the ribbon always comes into printing position for the next printing operation. In this manner the carbon ribbon will take up fully legible negative prints of each ticket in the order in which the tickets have been printed. The negative copy thus obtained is easily readable, for instance by means of a mirror. In the apparatus described the carbon ribbon is adapted between two consecutive printing operations to be fed forward through about six millimeters, being slightly more than the height of the larger types on the type wheels.

The apparatus is also adapted for issuing receipts or tickets referring to arbitrarily selected fares up to 9.95, that is, fares which are obtained without the aid of the fare strip of the apparatus. For this reason the fare strip may be disconnected from actuation upon the members of the apparatus which is effected by moving the lever 246 on the top of the cover of the apparatus from the position shown in Figs. 8 and 18 into the opposite end of the slot 247 through which it extends. Lever 246 is secured to rod 87 (see Fig. 8) and connected with toothed segment 248 meshing with another toothed segment 249 fixed to a shaft 250 (see also Fig. 11) which carries a cam 251. By the above said movement said cam will be turned into contact with levers 76 preventing the pins 79 from passing through the fare strip 59 and from functioning on the upper side of said strip as stops for the three setting members 83, 84 and 85. The setting of these members when using arbitrarily selected fare values is effected by means of keys 252 situated on top of the apparatus as shown in Figs. 7, 8, 9 and 18. As shown in Fig. 18 these keys are arranged in three rows the left hand and intermediate ones of which comprise each ten zig-zag placed keys for the figures 0 to 9, inclusive, the keys marked with 9 being, however, dummies which consequently may be dispensed with. The row to the right contains one key for 0 and one for 5, the latter also being a dummy. The key knobs, except those of the three dummies, are each secured to a rod extending perpendicularly upwards from a double-armed lever 253 arranged immediately below the cover 52 (see Fig. 7), said lever being rotatably mounted on a shaft 254 and having its shorter arm formed as a spring 255 tapering towards its free end and bearing on a rod 256, said spring by its tension retaining the key rod 253 raised against the cover 52. When the fare strip of the apparatus is again to be used, key arm 253 is prevented from being depressed by means of a cam 257 secured to rod 87 and shown in locking position in Fig. 7. When the fare strip 59 is disconnected from actuation by moving lever 246 into its opposite position, rod 87 and cam 257 secured thereto will, however, be turned in such manner as to cause the cam no longer to prevent depression of the key arm 253. Similar to the above-mentioned levers 76 the key arms are nineteen in number and of exactly the same thickness and are situated in exactly the same plane as said levers 76 to which they correspond in order. Consequently, they are arranged right above the levers 76 and in groups of nine key arms in the left-hand and intermediate groups and one key arm in the right-hand group, said groups corresponding to hundreds, tens and units, respectively. Extending perpendicularly downwards from each key arm is an abutment 258 tapering towards its point. When the key arm is depressed, the point of the abutment 258 bears on plate 71, the fore edge of said point forming a stop for the corresponding fare indicating member having the same function as the corresponding pin 79. The key arms 253 are adapted to be retained in depressed position by spring-actuated cams 260 rotatably mounted on a shaft 259 and being three in number, viz. one cam for each group of key arms, said cams being adapted to be turned in the one direction by means of pins 261 secured to shaft 259 (see Fig. 6). The cams 260 are adapted to engage a notch 262 in the abutment 258 (see Fig. 7), when the latter is in depressed position, and a similar notch 263 nearer to the point of the abutment when the latter is in raised position. This arrangement involves the advantage of a depressed key arm being released and raised by the action of spring 255, when another key arm in the same group is depressed by actuation of the corresponding key. Moreover, all of the key arms may be released by moving all of the three cams 260 out of engagement by means of a lever 264 (see Figs. 8 and 18) secured to shaft 259 and projecting through a slot 266 in the cover 52, lever 264 being returned by a return spring 265. This latter release must be employed, when the fare strip 59 is again to be used. By using the above said key setting means for printing receipts or tickets of arbitrarily selected fare values the fare set up by the keys may, of course, be checked up by turning the fare lever to the left causing the number set up to appear in the sight opening 108.

When the apparatus described is used for key setting it functions substantially in the same manner as cash registers having means provided for printing station numbers and so forth as described in the opening paragraphs of this specification. However, it is operating considerably faster than such cash registers, as the setting of station numbers and class of ticket takes place simultaneously by means of the hand-wheel 109 instead of by the aid of a key for each figure or letter, respectively.

The ticket apparatus above described is arranged for only one traffic line of 30 stations, but it may, of course, easily be arranged for a plurality of lines by adding to the fare strip the number symbols for the additional lines.

In the embodiment above described the levers 76 are operated mechanically. In Fig. 19 an embodiment is shown in which said operation takes place electrically. The members of this figure directly corresponding to those of the previously described embodiment are denoted by the same reference numerals provided with a prime ('). Provided below the row of levers 76' are solenoids 300 one for each of said levers which are formed with perpendicularly extending arms 301 forming armatures of the solenoids. In this embodiment the fare strip 59' and the feed roller 61' are situated apart from the levers 76' at an arbitrary place of the apparatus. Sliding on the fare strip 59' which is of electrically conductive material are contact springs 302 corresponding in number to that of the solenoids 300 and levers 76', thus in the embodiment shown nineteen, and each connected by a wire 303 with one pole of one of the solenoids 300. By their other pole the solenoids are connected by a wire 304 to a contact spring 305 sliding on the fare strip 59'. Inserted in the circuit are a battery 306 and a switch 307 the arm of which is adapted to be actuated by a cam disk 308 secured to the fare lever shaft 133'. The fare strip 59', which in this embodiment is provided with perforations forming number symbols arranged on the bias across the fare strip, is carried along a table 309 of non-conductive material situated at the contact place of the contact springs 302 on the opposite side of the fare strip 59'. On actuating the fare lever the switch 307 is immediately closed causing all of the solenoids to be energized except that or those the contacts spring 302 of which engages a perforation of the number symbol being in operative position. Thus, the levers 76' corresponding to energized solenoids are attracted out of the travel of the fare indicating members one of which 83' being shown in Fig. 19, whereas the lever or levers 76' corresponding to solenoids which on account of the breaking of the circuit due to the perforations of the fare strip are not energized remain in operative position by the action of their spring 77', thereby forming abutments for the fare indicating members substantially in the same way as described with reference to the previous embodiment.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention what I claim and desire to protect by Letters Patent is:

1. In a ticket issuing machine, a strip of rollable material having a plurality of groups of control indicia spaced apart along the strip and coded to correspond to different fares, sensing means adapted to co-operate with said groups of control indicia, means selectively to set said strip into a position in which a group of control indicia corresponding to a given combination of factors on which the fare depends is in operative position for co-operation with said sensing means, and means adapted to be adjusted by the sensing means to record on the ticket the fare corresponding to the group of control indicia in operative position.

2. In a ticket issuing machine, a strip of rollable material having a plurality of groups of perforations spaced apart along said strip, the perforations of each group occupying varying positions in the strip to correspond to different figures, sensing means adapted to co-operate with said groups of perforations, means selectively to set said strip into a position in which a group of perforations corresponding to a given combination of factors on which the fare depends is in operative position for co-operation with said sensing means, and means adapted to be adjusted by said sensing means to record on the ticket the fare corresponding to the group of perforations in operative position.

3. In a ticket issuing machine, a strip of rollable material having a plurality of groups of perforations spaced apart along said strip, the perforations of each group occupying varying positions in the strip to correspond to different figures, sensing means adapted to co-operate with the groups of perforations, setting means adapted to be set by said sensing means, means selectively to feed said strip into a position in which a group of perforations corresponding to a given combination of factors on which the fare depends is in operative position for co-operation with said sensing means, and means adapted to be adjusted by the setting means to record on the ticket the fare corresponding to the group of perforations in operative position.

4. In a ticket issuing machine, a strip of rollable material having a plurality of groups of perforations spaced apart along said strip, the perforations of each group occupying varying positions in the strip to correspond to different figures, a plurality of sensing fingers adapted to engage the perforations, means selectively to feed said strip into a position in which a group of perforations corresponding to a given combination of factors on which the fare depends is in operative position for co-operation with the sensing fingers, setting means adapted to be set by such sensing fingers which register with perforations in the strip, and means adapted to be adjusted by the setting means to record on the ticket the fare corresponding to the group of perforations in operative position.

5. In a ticket issuing machine, a strip of rollable material having a plurality of groups of control indicia spaced apart along the strip and coded to correspond to different fares, sensing means adapted to co-operate with said groups of control indicia, means to set said strip into a position in which a group of control indicia corresponding to a given combination of factors on which the fare depends is in operative position for co-operation with said sensing means, means connected with said strip setting means to indicate said combination, and means adapted to be adjusted by said sensing means to record on the ticket the fare corresponding to the group of control indicia in operative position.

6. In a ticket issuing machine, a strip of rollable material having a plurality of groups of control indicia spaced apart along the strip and coded to correspond to different fares, sensing means adapted to co-operate with said groups of control indicia, means to set said strip into a position in which a group of control indicia corresponding to a given combination of factors on which the fare depends is in operative position for co-operation with said sensing means, means for alining and locking the strip in set position, means to release the sensing means, a manually operable member operably connected with said strip locking means and said releasing means in such manner that, on actuation of said manually operable member, the strip is first locked and the sensing means then released, and means adapted to be adjusted by the sensing means to record on the ticket the fare corresponding to the group of control indicia in operative position.

7. In a ticket issuing machine, a strip of rollable material having a plurality of groups of perforations spaced apart along said strip, the perforations of each group occupying varying positions in the strip to correspond to different figures, sensing means adapted to co-operate with the groups of perforations, setting means adapted to be set by said sensing means, means to feed the strip into a position in which a group of perforations corresponding to a given combination of factors on which the fare depends is in operative position for co-operation with the sensing means, means for alining and locking the strip in set position, means to release said sensing means, a manually operable member operably connected with said releasing means and said strip locking means in such manner that the sensing means is released after the strip having been locked, and means adapted to be adjusted by the sensing means to record on the ticket the fare corresponding to the group of perforations in operative position.

8. In a ticket issuing machine, a strip of rollable material having a plurality of groups of perforations spaced apart along said strip, the perforations of each group occupying varying positions in the strip to correspond to different figures, sensing means adapted to co-operate with the groups of perforations, means to release said sensing means, setting means adapted to be set by said sensing means, means to feed the strip into a position in which a group of perforations corresponding to a given combinaton of factors on which the fare depends is in operative position for co-operation with said sensing means, means for alining and locking the strip in set position, means for releasing the setting means, a manually operable member operably connected with the strip locking means, the means for releasing the sensing means and the means for releasing the setting means in such manner that, on actuation of said manually operable member, the strip is first locked and the sensing means and setting means then released, and means adapted to be adjusted by the setting means to record on the ticket the fare corresponding to the group of perforations in operative position.

9. In a ticket issuing machine, a strip of rollable material having a plurality of groups of perforations spaced apart along said strip, the perforations of each group occupying vary positions in the strip to correspond to different figures, sensing means adapted to co-operate with said groups of perforations, means to release said sensing means, setting means adapted to be set by said sensing means, means to release said setting means, means to feed the strip into a position in which a group of perforations corresponding to a given combination of factors on which the fare depends is in operative position for co-operation with the sensing means, means for alining and locking said strip in set position, a manually oscillatory handle connected with the strip locking means, with the means to release the sensing means and with the means to release the setting means and adapted on its forward stroke successively to lock the strip, to release the sensing means and to release the setting means and on its return stroke to return the setting means into starting position, to return the sensing means into starting position and to unlock the strip, and means adapted to be adjusted by the setting means to record on the ticket the fare corresponding to the groups of perforations in operative position.

10. In a ticket issuing machine, a strip of rollable material having a plurality of groups of control indicia spaced apart along the strip and coded to correspond to different fares, sensing means adapted to co-operate with said groups of control indicia, means to release the sensing means, means to feed the strip into a position in which a group of control indicia corresponding to a given combination of factors on which the fare depends is in operative position for co-operation with the sensing means, means for alining and locking the strip in set position, a manually operable handle operably connected with the strip locking means and the means for releasing the sensing means in such manner that, on actuation of said handle, the strip is first locked and the sensing means then released, means adapted to be adjusted by the sensing means to record on the ticket the fare corresponding to the group of control indicia in operative position, and another manually operable handle for actuating said last-mentioned means, said last-mentioned handle being independent of the first-mentioned handle but adapted when actuated to bring the latter with it.

11. In a ticket issuing machine, a strip of rollable material having a plurality of groups of control indicia spaced apart along said strip and corresponding to different fares, sensing means adapted to co-operate with said groups of control indicia, means selectively to feed said strip into a position in which a group of control indicia corresponding to a given combination of factors on which the fare depends is in operative position for co-operation with the sensing means, setting means adapted to be adjusted by said sensing means, means to record on the ticket the fare corresponding to the group of control indicia in operative position, said recording means being adapted to be set by the setting means which acts as stop for same, and means to release said recording means.

12. In a ticket issuing machine, a strip of rollable material having a plurality of longitudinal rows of perforations in said strip, said perforations being assembled in transversal groups containing perforations of varying longitudinal rows to correspond to different figures, a number of sensing fingers equal to that of the longitudinal rows, means selectively to set the strip into a position in which a transversal group of perforations corresponding to a given combination of factors on which the fare depends is in operative position to co-operate with said sensing fingers, and means adapted to be adjusted by said sensing fingers to record on the ticket the fare corresponding to the group of perforations in operative position.

13. In a ticket issuing machine, a strip of rollable material having a plurality of groups of control indicia spaced apart along said strip and coded to correspond to different fares, sensing means adapted to co-operate with said groups of control indicia, means to feed the strip into a position in which a group of control indicia corresponding to a given combination of factors on which the fare depends is in operative position for co-operation with said sensing means, setting means adapted to be adjusted by said sensing means, means adapted to be adjusted by said setting means to record on the ticket the fare corresponding to the group of control indicia in operative position, a casing enclosing said strip, sensing means, setting means, strip feeding means and recording means, sight openings in said casing, means combined with said strip setting means to cause said combination to appear in a sight opening and another means combined with the setting means to cause said fare to appear in another sight opening.

KARL GUSTAF ALFRED BÄCKDAHL.